(12) United States Patent
Fisher

(10) Patent No.: US 6,546,704 B1
(45) Date of Patent: Apr. 15, 2003

(54) DOG BOOT

(76) Inventor: Lee A. Fisher, 7925 E. Solano Dr., Scottsdale, AZ (US) 85250

( * ) Notice: Subject to any disclaimer, the term of this patent is extended or adjusted under 35 U.S.C. 154(b) by 0 days.

(21) Appl. No.: 10/038,449

(22) Filed: Jan. 7, 2002

(51) Int. Cl.[7] .............................. B68C 5/00; A01K 27/00
(52) U.S. Cl. ............................ 54/82; D30/146; 119/856
(58) Field of Search ............................. 54/82; 119/850, 119/856, 814; 36/111; D30/146; 602/27

(56) References Cited

U.S. PATENT DOCUMENTS

| 2,064,566 | A | | 12/1936 | Richman | 36/2.5 |
|---|---|---|---|---|---|
| 2,446,371 | A | | 8/1948 | Jones | 36/2.5 |
| D167,092 | S | | 6/1952 | Monroe | D7/4 |
| 3,209,726 | A | * | 10/1965 | Fisher | 54/82 |
| D223,369 | S | | 4/1972 | Jackson | D30/1 |
| 3,742,679 | A | | 7/1973 | Jordan | 54/79 |
| D229,197 | S | * | 11/1973 | Jackson | D30/146 |
| D267,750 | S | | 1/1983 | Norstrom | D30/34 |
| 4,458,431 | A | | 7/1984 | Sinclair | 36/88 |
| 4,744,333 | A | | 5/1988 | Taylor | 119/96 |
| 4,967,542 | A | | 11/1990 | MacDonald | 54/82 |
| 5,148,657 | A | | 9/1992 | Stafford | 54/82 |
| 5,408,812 | A | | 4/1995 | Stark | 54/82 |
| 5,452,685 | A | | 9/1995 | Thomas | 119/850 |
| 5,495,828 | A | | 3/1996 | Solomon et al. | |
| D375,586 | S | | 11/1996 | Caditz | D30/146 |
| D379,251 | S | | 5/1997 | Mezey | D30/146 |
| D387,511 | S | | 12/1997 | Caditz | D30/146 |
| 5,897,518 | A | * | 4/1999 | Shaw | 602/23 |
| D417,530 | S | | 12/1999 | Danek | D30/146 |
| 6,024,055 | A | | 2/2000 | Jesse, Sr. et al. | 119/850 |
| 6,083,185 | A | * | 7/2000 | Lamont | 602/23 |

* cited by examiner

Primary Examiner—Charles T. Jordan
Assistant Examiner—Elizabeth Shaw
(74) Attorney, Agent, or Firm—Cahill, Sutton & Thomas P.L.C.

(57) ABSTRACT

A dog boot comprising a planar flexible sheet of material, having a high friction surface on one side thereof, is formed having a leg engaging section and a foot engaging section, each of which is intended to be wrapped around the leg and foot respectively of an animal. A stabilizer strap is provided for releasably being secured to the leg engaging section and foot engaging section after the boot has been mounted on the animal. The planar flexible material is formed having a high friction surface on one side thereof and incorporates a foam central layer and a stretchable fabric layer on the surface opposite the high friction surface.

5 Claims, 1 Drawing Sheet

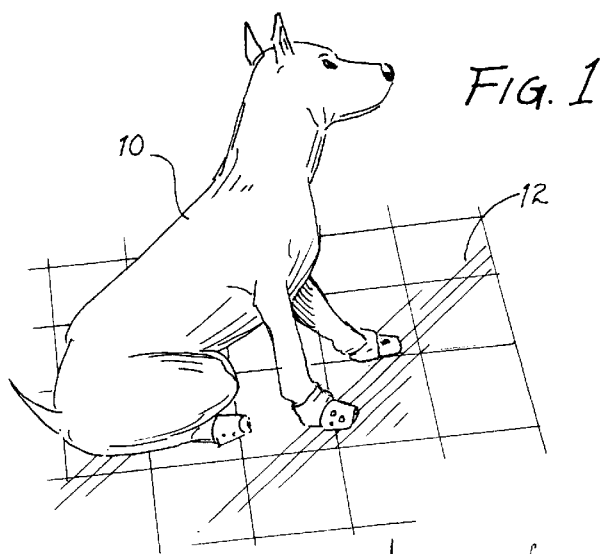
FIG. 1
FIG. 2
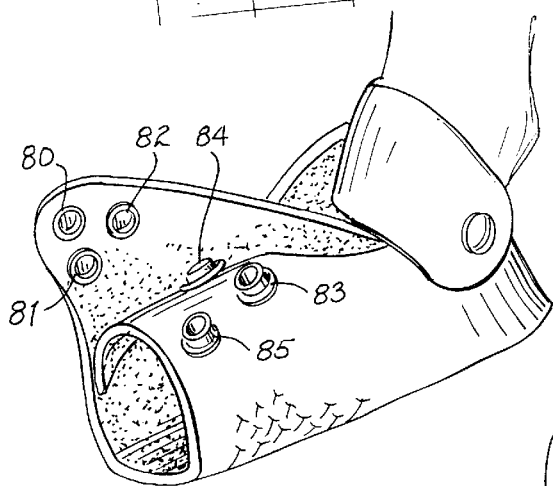
FIG. 3
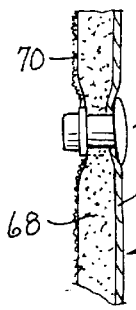
FIG. 5
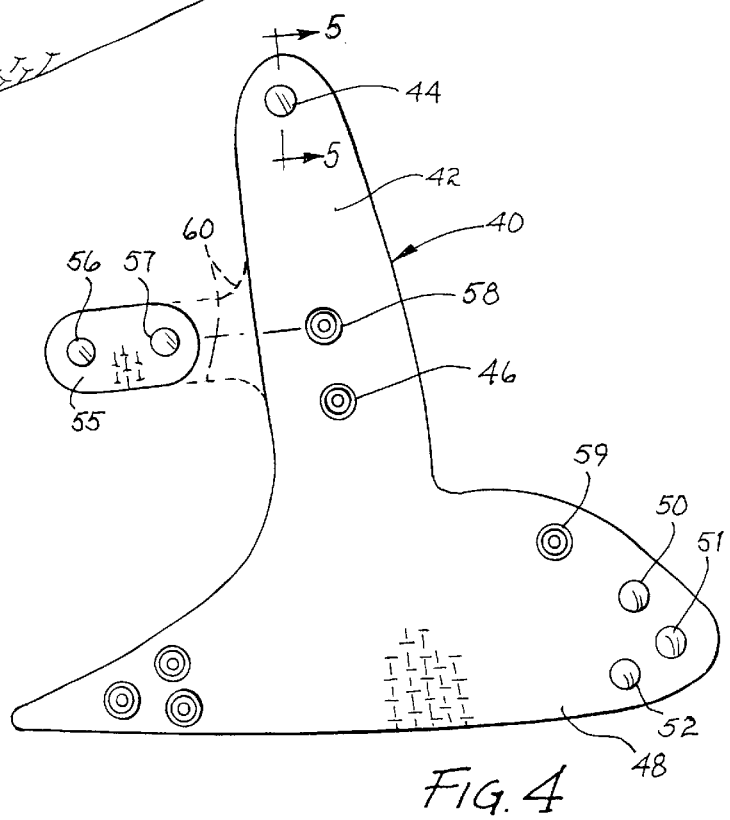
FIG. 4

DOG BOOT

FIELD OF THE INVENTION

The invention relates generally to devices for use on dog paws or feet to overcome certain inabilities of the individual animals, and to facilitate walking or other ambulatory action of the animal over slippery surfaces or floors, particularly under circumstances of certain debilitating conditions present in the animal.

BACKGROUND OF THE INVENTION

Numerous animal boots or dog boots or sandals have been provided in the prior art to facilitate the use by such animals for foot protection or comfort under a variety of circumstances. Most of the prior art dog boots or sandals are relatively complex and are generally directed at protecting the animal's foot under adverse conditions.

The present invention is directed to those circumstances wherein an animal of advanced age, or an animal having an arthritic or dysplastic condition encounters significant difficulty when attempting to walk or run over a slippery surface. Such surfaces are commonly found in homes in the form of vinyl or ceramic tile or exposed wood floors which cause the animal to slip, lose traction, and under certain circumstances, particularly with regard to aged animals, fall. A substantial problem is presented by older pets having lost a significant proportion of their mobility through arthritis or hip dysplasia. When an animal's ability to maintain balance or to regaining footing upon slipping is significantly or, under some circumstances, totally lost, it is important for them to be able to grip supporting surfaces with their feet.

The present invention is directed to older dogs that are feeble, arthritic or dysplastic or simply unable to maintain footing on slippery floors commonly found in the home. To this end, the present invention is directed to animal boots that are easily and effectively placed upon the animal's feet and can be readily removed. The boots provide a significant increased coefficient of friction between the animal and the supporting surface while nevertheless insuring that the boot remains in place and does not become dislodged or removed through the activities of the animal.

SUMMARY OF THE INVENTION

The above problems are addressed by the present invention through the utilization of a planar sheet of flexible and stretchable material that is cut into a predetermined form and can be wrapped around the animal's foot in such a way that the boot remains in position while providing a substantially increased coefficient of friction between the animal's foot and the slippery surface upon which the animal stands. The invention also provides a very economical means for forming such boot wherein the expense of manufacture, sale, packaging, etc. is effectively minimized while nevertheless permitting a convenient but effective means for mounting the boot upon the animal and insuring that the boot will remain in place while providing the necessary frictional contact with the supporting surface.

BRIEF DESCRIPTION OF THE DRAWINGS

The present invention may more readily be described by reference to the accompanying drawings, in which:

FIG. 1 is a perspective view of an animal wearing the boots of the present invention and sitting upon a ceramic tiled floor.

FIG. 2 is an enlarged perspective view of a portion of FIG. 1, showing one embodiment of the present invention mounted on the forefoot of the animal of FIG. 1.

FIG. 3 is a view of the opposite side of the boot shown in FIG. 2, with a portion of the boot "unsnapped" or disconnected to show the manner in which the boot of the present invention is wrapped on the foot or paw of the animal.

FIG. 4 is a top view of the flexible sheet of material forming the present invention and including the required stabilizer in both its separate and integrated format.

FIG. 5 is a cross-sectional view of FIG. 4, taken along lines 5—5.

DETAILED DESCRIPTION OF THE PREFERRED EMBODIMENT OF THE INVENTION

Referring to FIG. 1, an animal 10, such as a dog, is shown sitting upon a slippery surface 12, and in the case of FIG. 1, this surface is a ceramic tile. As mentioned previously, there are several surfaces upon which older animals may find difficult to maintain their footing. For example, ceramic tile is notorious as a surface upon which animals frequently slip and older animals are sometimes unable to regain their standing position. Similar surfaces, such as vinyl tile or even wood floors with a polished or plastic shining surface, present significant difficulties. These difficulties are amplified in those instances where the animal, through age, may have ailments such as arthritis or hip dysplasia. Similarly, animals that are convalescing from injuries will frequently be unable to safely travel over such slippery surfaces.

FIG. 2 shows one embodiment of the present invention mounted on the forefoot of the animal of FIG. 1. The dog boot 14 incorporates a leg engaging section 16 that wraps around the pastern above the foot. This leg engaging section is removably secured to the foot through the utilization of fastening means such as snaps or alternatively, other fastening means including convenient hook and eye type securing structures such as that known under the trademark Velcro®. The dog boot also includes a foot engaging section 20 which is wrapped about the foot of the animal and is releasably or removably fastened in place through the utilization of snaps 22 (hook and eye fasteners are also equally applicable at this point on the structure). In some applications it may be appropriate to use conventional buckles for securing the respective sections to the leg and foot of the dog.

As noted previously, the leg engaging section is wrapped around the pastern above the foot. For purposes of this description, reference will be made to the pastern to describe the positioning of the leg engaging section of the boot; however, it will be understood that the pastern (or metacarpus) is a conveniently located anatomical structure for the wrapping of the leg engaging section. With regard to the hind feet of the animal, the leg engaging section is wrapped about the metatarsus. For purposes of this description, reference will simply be made to the pastern, it being understood that the corresponding portions on the rear feet and legs are also intended.

A stabilizer 18 is detachably secured to both the leg engaging section 16 as well as the foot engaging section 20. The detachable connection is shown using typical snap fasteners 24 and 26, it being understood that other types of fastening means, such as hook and eye fasteners, are appropriate. The stabilizer or stabilizer strap 18 insures that both the leg engaging section and the foot engaging section maintain their respective positions when mounted on the animal. The stabilizer prevents the foot engaging section from working its way toward the digits or toes of the animal and becoming either entangled in the toes or slipping off the foot. Similarly, the stabilizer strap holds the foot engaging section in place by connecting to the leg engaging section which is wrapped around the pastern. It may be noted in FIG. 2 that the stabilizer strap 18 is a separate piece; however, it will be understood that in another embodiment, and perhaps the preferred embodiment, the stabilizer strap is formed integrally with either the leg engaging section or the foot engaging section and is detachably or releasably secured to the other through the utilization of the above-mentioned fastening means.

FIG. 4 is a top view of the dog boot of the present invention, showing the generalized shape of the dog boot in its unmounted form. The dog boot is formed of a planar, flexible and stretchable sheet of material formed of a material readily available on the market. The material with which the boot is made and which forms the planar, flexible sheet shown in FIG. 4 may typically be the same material readily available for such uses as wet suits or computer mouse pads. This material has a high friction surface on one side thereof that is generally a rubber contact surface, while the body of the sheet is of a foam material. The side or surface opposite the rubber contact surface of the sheet may be provided with a stretchable fabric-like layer. This material is readily available in various thicknesses and compositions. It was surprisingly found that the material having the foam center layer with a high coefficient of friction rubber contact surface on one side with a stretchable fabric layer on the opposite side was uniquely suitable for the formation of the sheet of FIG. 4 and the resulting dog boot of the present invention.

Referring now to FIG. 4, the planar, flexible and stretchable sheet of material 40 is formed with a leg engaging section 42 that wraps around the pastern above the foot of the animal. Fastening means, such as snap fasteners 44 and 46 are provided to secure the leg engaging section in place when it is mounted and wrapped around the pastern. The planar flexible sheet of material also includes a foot engaging section that wraps around the paw of the animal and is also provided with fastening means, such as snap fasteners 50, 51 and 52 to maintain the positioning of the boot when it is mounted on the animal's foot. A stabilizer strap 55 is shown in an independent form wherein the stabilizer 55 is a separate flat, planar, flexible and stretchable sheet of material having fastener means 56 and 57 thereon for attachment to both the leg engaging section at snap fastener 58 and the foot engaging section at snap fastener 59 when the latter are wrapped around the respective portions of the animal's foot. It may be noted that the stabilizer strap may more conveniently be formed integrally with either the leg engaging section or the foot engaging section of the general overall planar flexible sheet of material 40. As shown in FIG. 4, the stabilizer strap 55 may be formed integrally as part of the leg engaging section 42 as indicated by the broken lines 60.

The embodiment shown thus far incorporates typical snap fasteners, wherein it may be seen by reference to the cross-sectional figure of FIG. 5 that the snap fastener 65 is riveted in a conventional manner to the sheet of material 67, and that the sheet of material is formed of a foam core 68 having a rubber contact surface on one side 69 and may be provided with a stretchable fabric-like layer on the opposite side or surface 70. As shown in FIG. 3, these snap fasteners are convenient for positioning the ends of the respective sections of the dog boot after they have been wrapped around the appropriate portion of the animal's leg and foot. As shown in FIG. 3, the female half of metal snap fasteners 80, 81, and 82 are positioned to be engaged and connected to the corresponding male halves 83, 84 and 85, respectively, of the metal snap fasteners.

It may also be realized that, while the stabilizer strap is shown in separate format in FIG. 4, and also as indicated through the utilization of broken lines 60 an integral portion of a leg engaging section 42, the stabilizer strap could just as easily be formed as an integral part of the foot engaging section 48. In either case, it is important that the stabilizer be provided with a releasable fastening means for connection to the other portion (leg engaging or foot engaging sections) of the boot after the planar, flexible sheet of material of FIG. 4 is appropriately wrapped about the respective portions of the animal's foot.

In use, the planar, flexible sheet of material shown in FIG. 4 is placed on the animal's leg by wrapping the leg engaging section around the pastern of the animal and securing it in place through the utilization of the releasable fastening means, such as snap fasteners or hook and eye fasteners. The foot engaging section is then wrapped about the foot of the animal and is secured in a similar manner by engaging either snap fasteners or similar releasable fastening means. Finally, the stabilizer strap is connected to the releasable fastening means or snap fasteners on the leg engaging section and the foot engaging section. In those instances where the stabilizer strap is formed as an integral part of either the leg engaging section or the foot engaging section, the stabilizer strap is then secured to the releasable fastening means on that portion of the flexible sheet from which it does not extend. When mounted in this fashion, it has been found that older animals that have serious stability problems and are unable to maintain their footing on slippery surfaces or are unable to regain their footing if they recline or fall, quickly regain their stability and become accustomed to and acclimated to the wearing of such boots and resume their normal activity on such slippery surfaces as tile, etc.

The planar flexible, and stretchable sheet of material forming the dog boot of the present invention is expandable to accommodate the expansion of the animal's foot when the animal places pressure or weight on the foot and the animal toes or digits naturally separate and the foot expands. Therefore, the toes of the animal are left uncovered to provide freedom and comfort to the animal while the boots are being worn.

While the invention has been particularly shown and described herein with reference to a preferred embodiment thereof, it will be understood by those skilled in the art that various other modifications and changes may be made to the present invention from the principles of the invention as herein described without departing from the spirit and scope as encompassed in the accompanying claims. Therefore, it is intended in the appended claims to cover all such equivalent variations which may come within the scope of the invention as described.

What is claimed is:

1. A dog boot comprising:
    (a) a planar, flexible sheet of material having a high friction surface on one side thereof,
    (b) said sheet having a leg engaging section for wrapping around a pastern above a dog's foot, said leg engaging section having releasable fastening means for securing said section in place when wrapped around said pastern;
    (c) said sheet also having a foot engaging section for wrapping around a dog foot with said high friction surface positioned away from said foot, said foot engaging section having releasable fastening means for securing said foot engaging section in place when wrapped around said foot;

(d) said sheet including a stabilizer strap extending from one of said leg engaging section and said foot engaging section and having means for releasable securing said strap to one of said foot engaging section and leg engaging section respectively when said sections are in position on the foot and leg respectively.

2. The combination set forth in claim 1, wherein said stabilizer strap is formed integrally with said leg engaging section of the planar flexible sheet of material.

3. The combination set forth in claim 1, wherein said planar flexible sheet of material includes a stretchable fabric layer on a surface opposite the high friction surface.

4. A dog boot comprising:

(a) a planar, flexible sheet of material having a high friction surface on one side thereof;

(b) said sheet having a leg engaging section for wrapping around a pastern above a dog's foot, said leg engaging section having releasable fastening means for securing said section in place when wrapped around said pastern;

(c) said sheet also having a foot engaging section for wrapping around a dog foot with said high friction surface positioned away from said foot, said foot engaging section having releasable fastening means for securing said foot engaging section in place when wrapped around said foot;

(d) said sheet including a stabilizer strap extending from one of said leg engaging section and said foot engaging section and having means for releasable securing said strap to one of said foot engaging section and leg engaging section respectively when said sections are in position on the foot and leg respectively; and (e) said stabilizer strap releasably fastened to both the leg engaging section and the foot engaging section of said planar flexible sheet of material.

5. A dog boot comprising:

(a) a planar flexible and stretchable sheet of material having a high friction surface on one side thereof;

(b) said sheet having a leg engaging section for wrapping around a pastern above a dog's foot, said leg engaging section having releasable fastening means for securing said section in place when wrapped around said pastern;

(c) said sheet also having a foot engaging section for wrapping around a dog foot with said high friction surface positioned away from said foot, said foot engaging section having releasable fastening means for securing said foot engaging section in place when wrapped around said foot;

(d) a stabilizer strap having means for releasably securing said strap to said foot engaging section and to said leg engaging section when said sections are in position on the foot and leg respectively of the animal.

* * * * *